Oct. 31, 1950     A. H. V. VAN LIJF     2,528,023
STATOR FOR ELECTRIC MACHINE
Filed Feb. 5, 1947     2 Sheets-Sheet 1
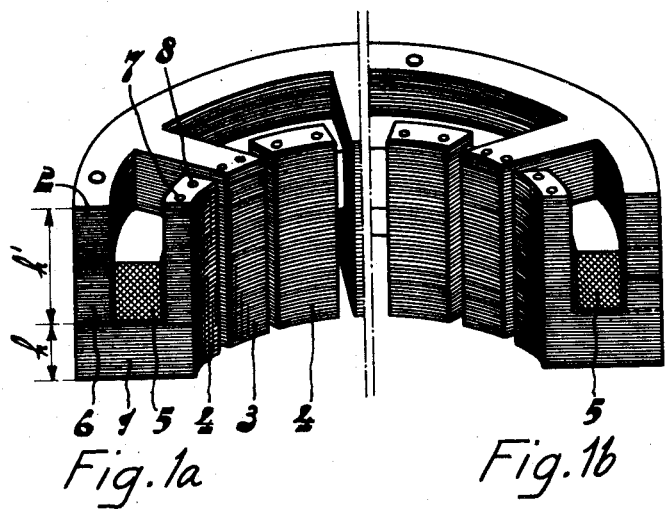
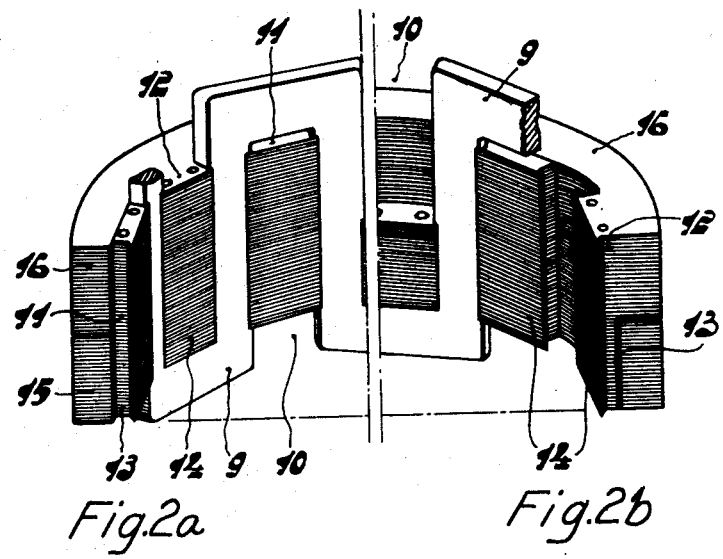
INVENTOR
A. H. V. VAN LIJF
BY
AGENT Oct. 31, 1950 A. H. V. VAN LIJF 2,528,023
STATOR FOR ELECTRIC MACHINE
Filed Feb. 5, 1947 2 Sheets-Sheet 2

INVENTOR
A.H.V. VAN LIJF
BY
AGENT

Patented Oct. 31, 1950

2,528,023

UNITED STATES PATENT OFFICE 2,528,023

STATOR FOR ELECTRIC MACHINES

Antonius Hubertus Victor van Lijf, Eindhoven, Netherlands, assignor to Hartford National Bank and Trust Company, Hartford, Conn., as trustee Application February 5, 1947, Serial No. 726,566
In the Netherlands February 2, 1944

Section 1, Public Law 690, August 8, 1946
Patent expires February 2, 1964

5 Claims. (Cl. 171—252)

This invention relates to a stator for an electric machine having a power up to some hundreds of watts, more particularly for a generator, and comprising a magnetic circuit constituted by at least two annular yokes removable in the direction of the rotor shaft and closed along their circumferences, half of the total number of poles protruding in the axial direction being arranged at the inner circumference of each of the yokes in such a manner that in the assembled state poles of alternate polarity exist along the inner circumference. The rotor can rotate along these poles.

Dynamos for bicycles which comprise such a type of magnetic circuit are known. In this case each of the two stator yokes with the associated armature poles is constituted by an annular channel of gutter-shaped cross-section. In the assembled state these parts jointly constitute an annular cage, a single annular coil being lodged in the channel. A circuit of this kind offers the advantage that on principle the stator is constituted by only three parts prepared beforehand, i. e. the two stator yokes with poles and a single coil, and can be mounted and dismounted in a simple manner. The assembling is effected in such a manner that the stator yokes are pushed in the axial direction towards each other over the coil, until the yokes join each other and constitute one unit in mechanical and technical respect.

The invention relates to a stator of this kind exhibiting in addition to the above-mentioned advantage some properties which render possible its use for powers higher than those of bicycle dynamos, for example up to some hundreds of watts.

To this end, in the stator according to the invention each of the yokes, together with the associated pole cores, is built up from a certain number of flat stampings normal to the rotor shaft, the ends of the poles protruding from each yoke in the direction of the rotor shaft being also constituted by stampings stacked in this direction. The latter may be secured in the form of a package to the other portion of the pole cores by means of a certain number of bolts. It is evident that the pole cores may in addition comprise pole-shoes.

Since the lamination of a magnetic circuit is known per se, the feature of the present invention must be seen in the application of this known means for a specific purpose, which consists in that a type of magnetic circuit which on principle may be built up from only three parts but which in the existing forms of construction is not serviceable or at most serviceable only by the use of measures comparatively complicated in technical respect for powers higher than those of, for example, a bicycle dynamo, is adapted also to these higher powers in a comparatively simple manner. In the stator circuit according to the invention it is only necessary for this purpose to stack a larger number of flat stampings of same shape.

Although, like with the known constructions, the stator coil may be a single annular coil, it may alternatively be constituted by a single wave winding realized as a former-wound coil, which is so curved that the grooves extend in the axial direction of the rotor, each pole-core of the stator in the plane of winding engaging a separate groove thereof. What is understood in this case by wave winding can be seen most clearly with the aid of a winding of which the supply wires cooperating with the poles of the rotor are located along the generatrices of a circular cylindrical surface and in which each extremity of each supply wire is connected to the nearest extremity of the adjacent supply wire. The space which exists between two consecutive supply wires then constitutes so-to-say a groove.

Since when using a wave winding the stator circuit normal to the rotor shaft must constitute one unit in magnetical respect, the protruding ends of the pole-cores of each yoke may for this purpose be in magnetic contact with the other yoke. A characteristic advantage thus obtained in addition to the advantage above already mentioned, which is as a rule inherent in the type, consists in that the path of the lines of force between the rotor and the stator is for this type as small as possible, since it extends solely in planes normal to the rotor shaft and thus practically does not extend also in the direction of the rotor shaft through the yoke parts and the pole cores. The planes in which the lines of force extend thus coincide, as is already known per se for other types of stators, with the surfaces of the lamination sheets, that is to say the lines of force follow the most advantageous way through the packet of sheets and do not in practice pass out of the package at right angles to the surfaces of the lamination sheets.

As a consequence of the smaller path of the lines of force, the dispersion and thus the amount of magnetic material required for the same power is in addition smaller than with the use of an annular coil.

If the existence of a somewhat longer path of lines of force and the resulting suppression of some advantages does not in practice involve any drawbacks, it is not necessary for the protruding ends of the pole cores of each stator sheet to be in magnetic contact with the other yoke. In this case it is also possible to cause the extremities of the pole-cores to extend freely into the interior of the stator and to establish the magnetic contact through the junction of the two stator yokes.

When using a wave winding, the head ends of the winding will lie in the axial direction outside the yokes if the pole cores in the axial direction are given a length equal to the total height of the stator in the assembled state. If this should be objectionable, the pole-core may be given a somewhat smaller length or each of the yokes may be given a somewhat greater width, so that the space that has come available may be utilized for housing the head ends of the winding. It is, however, also possible to adhere to the first-mentioned length of the pole-cores or even to give them a greater length and to arrange between the stator yokes a flat ring, of magnetic or of non-magnetic material, of such thickness that the head ends of the winding may be lodged in the space that has come available by pushing back the ends of the pole-cores. Consequently, in the two last-mentioned cases no parts of the winding protrude from the stator, a smooth box so-to-say being obtained, at the top and at the bottom of which the head ends of the windings are visible.

The outer periphery of the stator may have different shapes, for example it may be circular, square, rectangular or polygonal.

In order that the invention may be more clearly understood and readily carried into effect, it will now be described more fully with reference to the accompanying drawing.

Fig. 1a is a sectional perspective view of part of a stator of the type having an annular coil, Fig. 1b is similar view of the same type of stator but having a modified magnetic circuit, Fig. 2a is a sectional view of part of a stator of the type having a wave winding, Fig. 2b is a view similar to Fig. 2a but showing a modified magnetic circuit.

Figures 3, 4:
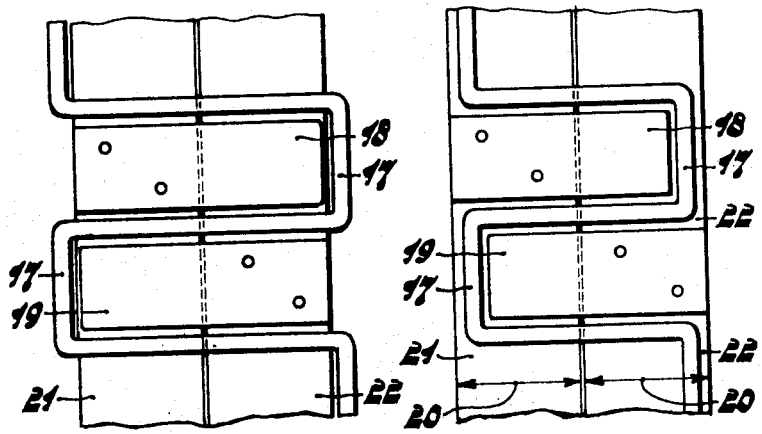
Figs. 3, 4 and 5 illustrate diagrammatically several possibilities for the dimensions of the coils, of the pole cores and of the height of the stator, taken in mutual connection.

The magnetic circuit shown in both Figs. 1a and 1b is constituted by two annular yokes, indicated by 1 and 2 in Fig. 1a, which can be removed in the axial direction of the rotor (not shown) and which are closed at their circumferences. On each of these yokes, at the height $h$, there are arranged along the inner circumference half of the total number of pole cores 3 and 4 extending in the axial direction, in such a manner that in the assembled state shown of the stator poles of alternate polarity can be formed along the inner circumference. The annular stator coil 5 is lodged in the groove-shaped channel formed by the pole-cores. In order to be able to obtain a closed magnetic path of the lines of force between two adjacent poles, in Fig. 1a a ring 6 of magnetically conductive material is arranged between the yokes 1 and 2. It is, however, also possible, as is shown in Fig. 1b, to divide the ring in the axial direction into two rings and to unite each of these rings of half height with a stator yoke.

As can be clearly seen from Figs. 1a and 1b, the whole circuit is built up from flat stampings stacked in the direction of the rotor shaft. A portion of the pole-core sheets, viz. that at the height $h$ (Fig. 1a) constitutes one unit with the yoke stampings. The portion $h'$, which protrudes in the axial direction, is constituted by sheets fastened to the lower parts of the pole-cores with the aid of bolts 7 and 8. The same applies to those portions of the stator yokes Fig. 1b which, as described, may be imagined to be formed by the ring 6 (see dotted lines). Owing to this lamination it is possible to adapt the circuit to higher powers only by increasing the number of stacked lamination sheets of the same shape as those already used.

The form of construction shown in Figs. 2a and 2b shows a single wave winding 9, which is realized as a former-wound coil and which is so curved that the grooves 10 of this winding extend in the axial direction of the rotor cooperating with the stator. Each of the pole cores 11, 12 of the stator engages one of the grooves 10, whilst the protruding ends of the poles of each yoke are in magnetic contact with the other yoke, as is indicated by 13 in the figure. The pole-cores comprise pole-shoes 14. The coil is released without any further means by pushing the two stator halves 15 and 16 away from each other in the axial direction.

As can be seen from Figs. 2a and 2b, this form of construction offers, in addition, the possibility to utilize a comparatively large diameter of the rotor, since the poles need protrude but slightly from the coil.

Fig. 3 shows separately a portion of the view of the inside of the stator, the fastening of the pole-cores being shown diagrammatically by the points drawn.

Fig. 4 illustrates in what manner the protruding coil heads 17 of Fig. 3 can be protected from damage. In Fig. 4 this is ensured by reducing the length of the pole cores 18, 19 in the direction of the rotor shaft, so that the coil heads can be lodged in the spaces that have come available. If the induction in the pole-core would be affected by this measure, it is also possible to leave the said length of pole-core unvaried and to increase the width 20 of the stator yokes 21 and 22 to the extent desired.

Figure 5:
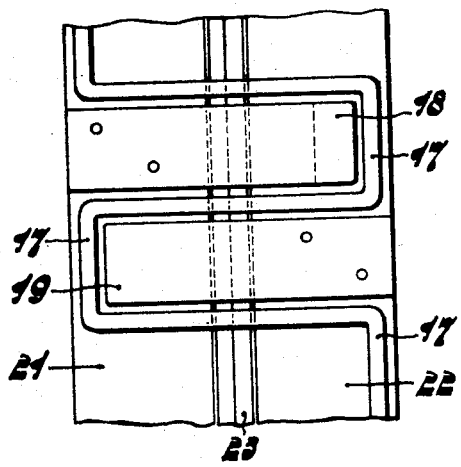

In this case it is still simpler, however, to widen the total width of the yoke by the use of a separate ring 23, which is not provided with poles. In Fig. 5 this ring is arranged between the two yokes. In this case the pole-cores may be given a length equal to that of Fig. 3, which length is indicated by a dotted line.

Since it is only required that the stator should constitute one unit in magnetical respect in planes normal to the rotor shaft, the ring 23 may be of magnetic or of non-magnetic material.

What I claim is:

1. A stator for a dynamo having a power output of several hundred watts comprising two axially aligned abutting annular magnetic yokes having closed inner and outer circumferential walls, a plurality of axially extending pole members protruding from and supported by said annular yokes, each of said annular yokes supporting half of said pole members, said pole members being disposed and supported by the inner circumferential walls of said yokes in such manner that coextensive poles of alternate polarity extend axially along the inner circumferential walls of each of said respective yokes, said yokes and said pole members comprising a plurality of laminations which are normal to the axis of said yokes.

2. A stator for a dynamo having a power output of several hundred watts comprising a first annular magnetic yoke having closed inner and outer circumferential walls, a first set of axially extending pole members of like polarity protruding from and supported by the inner circumferential wall of said yoke, a second annular magnetic yoke axially aligned with and abutting the first yoke and having closed inner and outer circumferential walls, a second set of pole members of like polarity extending axially along said yoke and having a polarity different from the polarity of said first set of pole members protruding from and supported by the inner circumferential wall of said second yoke, said first and second yokes being arranged and disposed to provide coextensive poles of alternate polarity protruding from and axially extending along the inner circumferential walls of said respective yokes, and a single wave-winding disposed around the pole members in such manner that said winding is axially wound between respective pole members and in a groove-space formed by respective pole members, said pole members and said yokes comprising a plurality of laminations which are normal to the axis of said yoke.

3. A stator for a dynamo having a power output of several hundred watts comprising a first annular magnetic yoke having closed inner and outer circumferential walls, a first set of axially extending pole members of like polarity protruding from and supported by the inner circumferential wall of said yoke, a second annular magnetic yoke axially aligned with and abutting the first yoke and having closed inner and outer circumferential walls, and a second set of pole members of like polarity extending axially along said yoke and having a polarity different from the polarity of said first set of pole members protruding from and supported by the inner circumferential wall of said second yoke, said first and second yokes being arranged and disposed to provide coextensive poles of alternate polarity protruding from and axially extending along the inner circumferential walls of said respective yokes, said pole members being further arranged and disposed to provide direct magnetic contact between the yokes, and said yokes and said pole members comprising a plurality of laminations which are normal to the axis of said yoke.

4. A stator for a dynamo having a power output of several hundred watts comprising a first annular magnetic yoke having closed inner and outer circumferential walls, a first set of axially extending pole members of like polarity protruding from the inner circumferential wall of said yoke, a second annular magnetic yoke axially aligned with the first yoke and having closed inner and outer circumferential walls, a second set of axially extending pole members of like polarity and having a polarity different from the polarity of said first set of pole members protruding from the inner circumferential wall of said second yoke, said first and second yokes being arranged and disposed to provide coextensive poles of alternate polarity axially extending along the inner circumferential walls of said respective yokes, and a single wave-winding disposed around the pole members in such manner that said winding is axially wound between respective pole members and in a groove formed by respective pole members, said annular yokes protruding in an axial direction beyond said pole members to provide a roof for the ends of said wave winding, and said pole members and said yokes comprising a plurality of laminations which are normal to the axis of said yoke.

5. A stator for a dynamo comprising a plurality of axially aligned annular yokes each having closed inner and outer circumferential walls, a first set of axially extending pole members of like polarity protruding from the inner circumferential wall of one of said yokes, a second set of axially extending pole members of like polarity and having a polarity different from the polarity of said first set of pole members protruding from another of said yokes, said yokes being arranged and disposed to provide coextensive poles of alternate polarity axially extending along the inner circumferential walls of said respective yokes, and separating ring members interposed between each of said yokes without pole members protruding therefrom, said pole members and said yokes comprising a plurality of laminations which are normal to the axis of said yoke.

ANTONIUS HUBERTUS VICTOR van LIJF.

REFERENCES CITED

The following references are of record in the file of this patent:

UNITED STATES PATENTS

| Number | Name | Date |
| --- | --- | --- |
| 588,602 | Rice | Aug. 24, 1897 |
| 680,597 | Joel | Aug. 13, 1901 |
| 829,015 | Johnson | Aug. 21, 1906 |
| 966,246 | Schurch | Aug. 2, 1910 |
| 1,554,438 | Lee | Sept. 22, 1925 |
| 2,212,192 | Howell | Aug. 20, 1940 |
| 2,243,318 | Rawlings | May 27, 1941 |

FOREIGN PATENTS

| Number | Country | Date |
| --- | --- | --- |
| 635,295 | France | Dec. 27, 1927 |